(12) United States Patent
Takeshima et al.

(10) Patent No.: US 6,972,656 B2
(45) Date of Patent: Dec. 6, 2005

(54) SWITCHING POWER SUPPLY DEVICE

(75) Inventors: Yoshihiro Takeshima, Nara (JP); Koji Yoshida, Ikoma (JP); Satoshi Ikeda, Suita (JP); Mitsuhiro Matsuo, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 78 days.

(21) Appl. No.: 10/639,197

(22) Filed: Aug. 11, 2003

(65) Prior Publication Data
US 2004/0042240 A1  Mar. 4, 2004

(30) Foreign Application Priority Data
Aug. 29, 2002 (JP) .............................. 2002-251786

(51) Int. Cl.[7] ............................................ H01F 27/28
(52) U.S. Cl. ...................... 336/180; 336/232; 363/98
(58) Field of Search ............................ 336/200, 232, 336/233, 234, 84, 183, 180; 29/602.1, 802; 363/68, 61, 24, 98, 56.02

(56) References Cited

U.S. PATENT DOCUMENTS
4,873,757 A * 10/1989 Williams .................. 29/602.1

FOREIGN PATENT DOCUMENTS
JP          06302443     * 10/1994   .......... H01F 27/28

* cited by examiner

*Primary Examiner*—Rajnikant B. Patel
(74) *Attorney, Agent, or Firm*—Sheridan Ross PC

(57) ABSTRACT

A switching power supply device of the present invention comprises a transformer having at least a first primary coil, a first secondary coil, a second secondary coil, a second primary coil, and laminated in the sequence of the first primary coil, the first secondary coil, the second secondary coil, the second primary coil, and having a configuration wherein a center tap is drawn out from a connecting part between one end of said first secondary coil and one end of said second secondary coil; a switching part for alternately applying a voltage in a forward direction and an inverse direction to said transformer; a rectifying part for rectifying the voltage induced across the center tap of the transformer and the other end of the first secondary coil or the other end of the second secondary coil; a smoothing part for smoothing the voltage of the rectifying part; and a control part for controlling the on-off of the switching part so that the output voltage becomes stable.

10 Claims, 7 Drawing Sheets

(a)

(b)

(c)

US 6,972,656 B2

SWITCHING POWER SUPPLY DEVICE

BACKGROUND OF THE INVENTION

The present invention relates to a switching power supply device for supplying DC stabilizing voltage to industrial or consumer electronic equipments.

In recent years, miniaturization/thinning of magnetic components such as transformers used in switching power supply devices, are strongly demanded along with the miniaturization of electronic equipments. To meet such requests, a laminated transformer which is laminated with either an identical kind of coils or a combination of coils, in which a coil that has a conductor wire spirally wound and a spiral coil die-cut from a thin conductor are used as the transformer winding of the switching power supply device.

Hereinafter, a conventional switching power supply device will be described with reference to FIG. 6.

FIG. 6 shows a conventional switching power supply device, in which part (a) of FIG. 6 is a circuit block diagram of the full bridge converter, part (b) of FIG. 6 is a sectional view of its transformer winding part and part (c) of FIG. 6 is a full view of the spiral coil which is one of the windings in its transformer winding part.

The switching power supply device in part (a) of FIG. 6 includes an input DC power supply 1, an input terminal 2a–2b, a transformer 3, a first switching element 4, a second switching element 5, a third switching element 6, a fourth switching element 7, a first rectifying diode 8a, a second rectifying diode 8b, an inductance element 9, a smoothing capacitor 10, an output terminal 11a–11b, a load 12, and a control circuit 20. Furthermore, G1, G2, G3, G4 indicates a turn-on signal sent out by the control circuit 20.

The input DC power supply 1 is connected to the input terminal 2a–2b and supplies a power supply voltage Vin.

The first switching element 4 and the second switching element 5 are connected in series, and connected to the input terminal 2a–2b. The third switching element 6 and the fourth switching element 7 are connected in series, and connected to the input terminal 2a–2b.

One end of the primary winding 3a is connected to the connecting point between the first switching element 4 and the second switching element 5, and the other end is connected to the connecting point between the third switching element 6 and the fourth switching element 7. The first secondary winding 3b and the second secondary winding 3c are connected in series. The wire turn ratio of the primary winding 3a, the first secondary winding 3b and the second secondary winding 3c is N:1:1 (N is an arbitrary positive number).

The anode of the first rectifying diode 8a is connected with one end of the first secondary winding 3b of the transformer 3, and anode of the second rectifying diode 8b is connected to one end of the second secondary winding 3c. Cathodes of both rectifying diodes are connected to each other. The other end of the first secondary winding 3b and the other end of the second secondary winding 3c are connected to each other and connected to the output terminal 11b.

The inductance element 9 and the smoothing capacitor 10 are connected in series, configuring a smoothing circuit. One end of the inductance element 9 is connected to the connecting point between the cathode of the first rectifying diode 8a and the cathode of the second rectifying diode 8b, and the other end is connected to the output terminal 11a. One end of the smoothing capacitor 10 is connected to the output terminal 11a, and the other end is connected to the connecting point between the first secondary winding 3b and the second secondary winding 3c (output terminal 11b).

The smoothing capacitor 10 has a sufficiently large capacitance, and rectifies and smoothes the voltage that occurs in the secondary winding of the transformer 3. The voltage Vout across both ends of the smoothing capacitor 10 (a voltage across 11a–11b) becomes the output voltage.

A reference numeral 12 denotes a load, which is connected to the output terminal 11a–11b and consumes electric power.

A reference numeral 20 denotes a control circuit, which drives the first switching element 4 and the second switching element 5 and the third switching element 6 and the fourth switching element 7 in a predetermined on-off ratio by outputting turn-on signals G1, G2, G3 and G4 to stabilize the output DC voltage Vout.

The transformer 3 will be described in detail with reference to parts (b) and (c) of FIG. 6. Part (b) of FIG. 6 is a sectional view of the transformer winding part, and part (c) of FIG. 6 is a full view of the spiral coil.

As shown in part (b) of FIG. 6, the transformer 3 has a first primary coil 3a1, a second primary coil 3a2, a third primary coil 3a3, a fourth primary coil 3a4, and a first secondary coil 3b1, a second secondary coil 3c1, a third secondary coil 3b2 and a fourth secondary coil 3c2.

The first primary coil 3a1 and the second primary coil 3a2 and the third primary coil 3a3 and the fourth primary coil 3a4 are connected in series, configuring the primary winding 3a shown in part (a) of FIG. 6. The first secondary coil 3b1 and the third secondary coil 3b2 are connected in series, configuring the first secondary winding 3b shown in part (a) of FIG. 6. The second secondary coil 3c1 and the fourth secondary coil 3c2 are connected in series, configuring the second secondary winding 3c shown in part (a) of FIG. 6.

In regard to the sequence of the lamination of each coil, the coils will be laminated in sequence of, from top to bottom, first primary coil 3a1, first secondary coil 3b1, second primary coil 3a2, third secondary coil 3b2, third primary coil 3a3, second secondary coil 3c1, fourth primary coil 3a4, fourth secondary coil 3c2.

By laminating in such manner the magnetic coupling between the primary coil and the secondary coil can be strengthened part (c) of FIG. 6 is a full view of one of the windings of the transformer winding part 3 of the transformer 3.

The operation of the switching power supply device, which is configured as mentioned above, will be described.

Operational waveform chart of each part of the conventional switching power supply device is shown in FIG. 7. In FIG. 7, part (a) shows the voltage waveform of the signal G1 which controls the on-off of the first switching element 4, and part (b) shows the voltage waveform of the signal G2 which controls the on-off of the second switching element 5. Part (c) shows the voltage waveform of the signal G3 which controls the on-off of the third switching element 6, and part (d) shows the voltage waveform of the signal G4 which controls on-off of the fourth switching element 7. Part (e) shows the waveform of the voltage Vp applied to the primary winding 3a of the transformer 3. Part (f) shows the waveform of an electric current Id1 which flows in the first rectifying diode 8a, and part (g) shows the waveform of an electric current Id2 which flows in the second rectifying diode 8b.

In the conventional switching power supply device, as shown in FIG. 7, the switching element 4 and the switching element 7 becomes a set and turns on at the same time, and the switching element 5 and the switching element 6 becomes a set and turns on at the same time. By repeating the sets to alternately turn on and off, the voltage Vin and −Vin are applied alternately to the primary winding 3a of the transformer 3.

First, when the second switching element 5 and the third switching element 6 turns on at the same time by the turn-on signal G2 and G3 from the control circuit 20, voltage −Vin is applied to the primary winding 3a of the transformer 3. Thereupon, voltage −Vin/N occurs in the first secondary winding 3b of the transformer 3, and the first rectifying diode 8a becomes a reverse bias and turns off, while the second rectifying diode 8b becomes a forward bias and turns on.

Next, when the first switching element 4 and the fourth switching element 7 turns on at the same time by the turn-on signal G1 and G4 from the control circuit 20 after both G2 and G3 turns off by the turn-on signal from control circuit 20, an input voltage Vin is applied to the primary winding 3a of the transformer 3. Thereupon, voltage Vin/N occurs in the first secondary winding 3b of the transformer 3, and the first rectifying diode 8a becomes a forward bias and turns on, while the second rectifying diode 8b becomes a reverse bias and turns off. An electric current based on a voltage induced by the first secondary winding 3b of the transformer 3 flows in the inductance element 9.

The electric current that flows in the inductance element 9 increases linearly. Thereupon, an electric current flowing in the inductance 9 flows in the first secondary winding 3b of the transformer 3, and electric current of the wire turn ratio-fold of transformer 3 (by 1/N) flows in the primary winding 3a of the transformer 3.

When the second switching element 5 and the third switching element 6 both turns off, the first winding 3a of the transformer 3 is opened and the induced voltage of the first secondary winding 3b and the second secondary winding 3c of the transformer 3 becomes zero. The electric current is distributed and flows in the first secondary winding 3b and the second secondary winding 3c of the transformer 3 so as to maintain the continuity of the magnetic flux of the transformer 3. The period while the electric current is distributed and flows in the secondary winding of the transformer will hereinafter be described as "current distribution period".

In the current distribution period, a strong magnetic field is generated in the space between the first secondary winding 3b and the second secondary winding 3c due to the electric current that flows in the first secondary winding 3b and the second secondary winding 3c. Since the first winding 3a is in an open status during the current distribution period, the electric current between the ends of the primary winding 3a is zero. Consequently, a loop electric current is induced due to the strong magnetic field generated by the first secondary winding 3b and the second secondary winding 3c, on the surface so that the total electric current of the conductor of the third primary coil 3a3 as a whole body which is located in between the first secondary winding 3b and the second secondary winding 3c becomes zero, thereby having a problem in which the induced electric current incurs a loss.

For example, in regard to the general transformer configured so that a wire is wound on the EI-cut core, completely separating the primary winding from the secondary winding, there is also a problem in which a sufficient magnetic coupling between the primary winding and the secondary winding can not be obtained, since the average distance between the primary winding and the secondary winding is long. Therefore, a switching power supply device using the above-mentioned configuration has a problem in which a high conversion efficiency can not be obtained.

The present invention solves the above-mentioned problems, and its object is to provide a switching power supply device having a high conversion efficiency using a transformer in which the magnetic coupling between the primary winding and the secondary winding is strong and losses are small.

BRIEF SUMMARY OF THE INVENTION

In order to solve the above-mentioned problems, the present invention has a following configuration.

A switching power supply device in accordance with the present invention from one aspect is a switching power supply device that comprises a transformer having at least a first primary coil, a first secondary coil, a second secondary coil and a second primary coil, which are laminated in the sequence of above-mentioned first primary coil, above-mentioned first secondary coil, above-mentioned second secondary coil and above-mentioned second primary coil, and having a configuration wherein a center tap is drawn out from a connecting part between one end of above-mentioned first secondary coil and one end of above-mentioned second secondary coil; a switching part for alternately applying a voltage in a forward direction and an inverse direction to above-mentioned transformer; a rectifying part for rectifying the voltage induced across above-mentioned center tap of above-mentioned transformer and the other end of above-mentioned first secondary coil or the other end of above-mentioned second secondary coil; a smoothing part for smoothing the voltage of above-mentioned rectifying part; and a control part for controlling the on-off of above-mentioned switching part so that the output voltage becomes stable.

A switching power supply device in accordance with the present invention from another aspect is a switching power supply device comprises a transformer having a configuration wherein a unit lamination body having at least a first primary coil, a first secondary coil, a second secondary coil and a second primary coil, laminated in the sequence of above-mentioned first primary coil, above-mentioned first secondary coil, above-mentioned second secondary coil, above-mentioned second primary coil, and/or a unit lamination body having at least above-mentioned first primary coil, above-mentioned first secondary coil, above-mentioned second secondary coil and above-mentioned second primary coil, laminated in the sequence of above-mentioned first primary coil, above-mentioned second secondary coil, above-mentioned first secondary coil and above-mentioned second primary coil, is laminated in multiple layers or are laminated in multiple layers by combining both unit lamination bodies, and wherein a center tap is drawn out from a connecting part between one end of above-mentioned first secondary coil and one end of above-mentioned second secondary coil, each coil being made by connecting a plurality of unit lamination bodies between each other; a switching part for alternately applying a voltage in a forward direction and an inverse direction to above-mentioned transformer; a rectifying part for rectifying the voltage induced across above-mentioned center tap of above-mentioned transformer and the other end of above-mentioned first secondary coil or the other end of above-mentioned second secondary coil, each coil being made by connecting a plurality of unit lamination bodies; a smoothing part for smoothing the voltage of above-mentioned rectifying part;

and a control part for controlling the on-off of above-mentioned switching part so the output voltage becomes stable.

It is suitable to include an inversed unit lamination body (e.g. a unit lamination body laminated in the sequence of a second primary coil, a second secondary coil, a first secondary coil, a first primary coil, or a unit lamination body laminated in the sequence of a second primary coil, a first secondary coil, a second secondary coil, a first primary coil) in the lamination.

A switching power supply device in accordance with the present invention from another aspect is characterized in that, in above-mentioned transformer, all primary coils are connected in series.

A switching power supply device in accordance with the present invention from another aspect is characterized in that, in above-mentioned transformer, parallel-connected body is configured by connecting the primary coils of unit lamination bodies in parallel, and above-mentioned parallel-connected bodies are each connected in series.

A switching power supply device in accordance with the present invention from another aspect is characterized in that, in above-mentioned transformer, a primary coil and a secondary coil are laminated in multiple layers wherein each of multiple layers is configured of a printed circuit board coil, the printed circuit board has a conductive pattern dispensed on a insulation circuit board, and the primary coil and the secondary coil are connected via a connecting part of the inner end or the outer end of the coil pattern, configuring windings.

A switching power supply device in accordance with the present invention from another aspect is characterized in that, in above-mentioned transformer, the number of wire turns of the primary coil and/or the secondary coil is one turn in each layer or as the whole body. Print circuit boards (layers) having a coil pattern of one turn are laminated, and the whole body is either connected in series or connected in parallel, forming a primary winding and/or a secondary winding.

For example, when the voltage applied to the primary winding is a high voltage equal to or above the predetermined value, a creepage distance for insulation above certain amount must be maintained between the primary winding, the secondary winding and the core from safety standard. When a coil pattern exceeds one turn, a through hole must be provided at the inner end of the coil pattern. However, when a through hole is provided and a creepage distance for insulation above certain amount is maintained between the through hole and other patterns or the core, a problem will incur in which the transformer becomes large. In the present invention, there is no need to provide a through hole at the inner end of the coil pattern in regard to the winding of which the coil pattern of the circuit board is one turn. With the present invention, a compact and thin transformer can be achieved.

A switching power supply device in accordance with the present invention from another aspect is characterized in that, in each layer or as a whole body in above-mentioned transformer, the number of wire turns of the primary coil is N turn (N is an arbitrary positive number), and the number of wire turns of above-mentioned first secondary coil and above-mentioned second secondary coil is one turn.

In the switching power supply device of the present invention, the wire turn ratio of the primary winding, the first secondary winding and the second secondary winding is N:1:1.

A printed circuit board having a coil pattern of N turn is laminated, and the whole body is either connected in series or connected in parallel, forming a primary winding. A printed circuit board having a coil pattern of one turn is laminated, and the whole body is either connected in series or connected in parallel, forming a secondary winding. The secondary winding is connected via a connecting part of the outer end of the coil pattern. With the present invention, a compact and thin transformer can be achieved.

The present invention has an effect to achieve a switching power supply device having a high conversion efficiency using a transformer in which the magnetic coupling between the primary winding and the secondary winding is strong and losses are small.

The novel features of the invention are set forth with particularity in the appended claims. The invention as to both structure and content, and other objects and features thereof will best be understood from the detailed description when considered in connection with the accompanying drawings.

Figure 5:
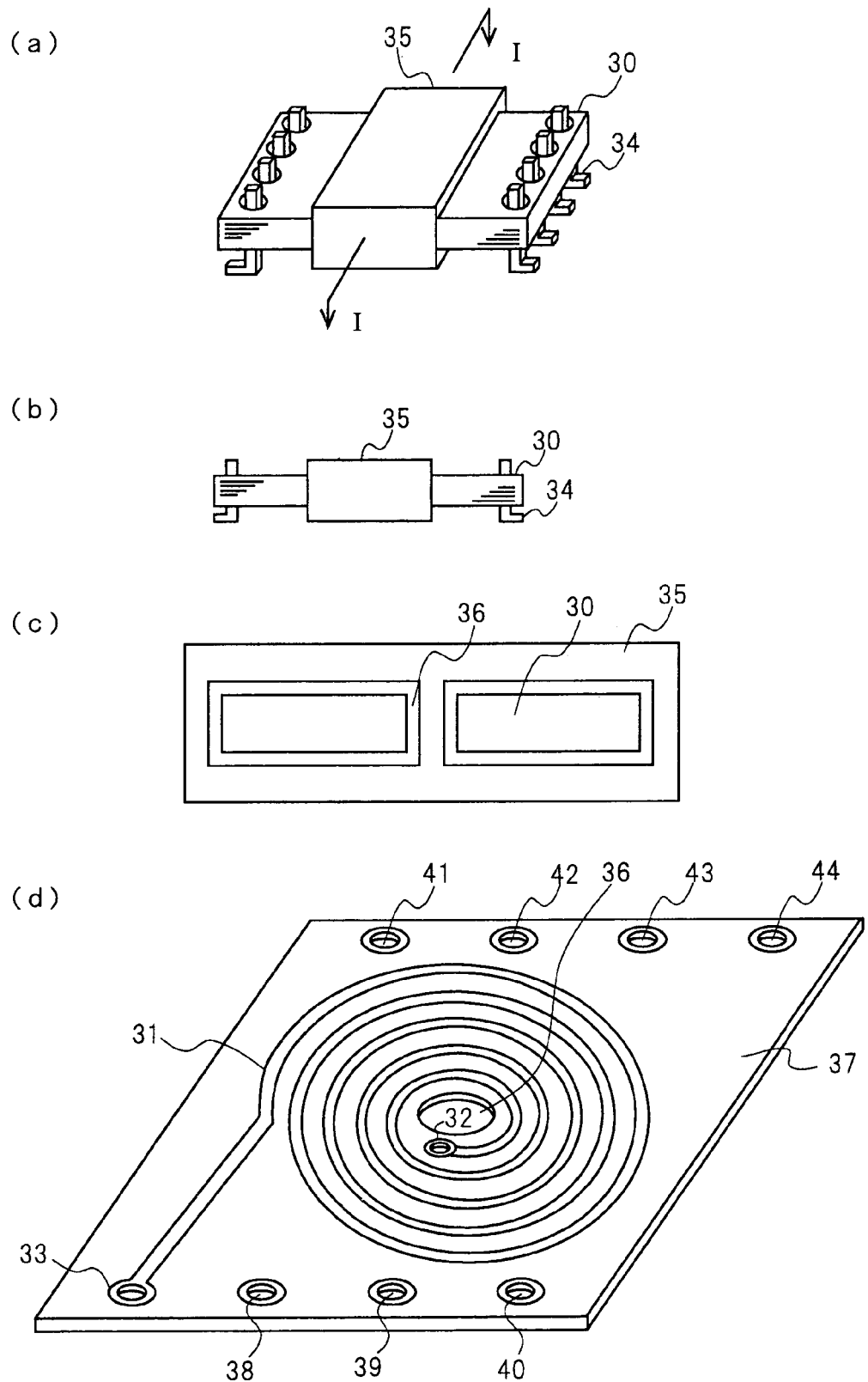
Figure 6:
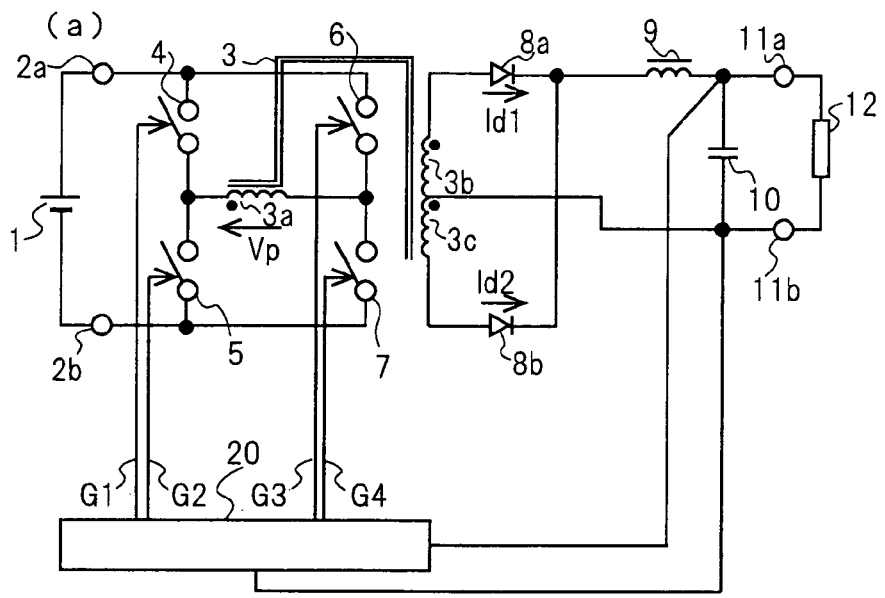
Figure 6:
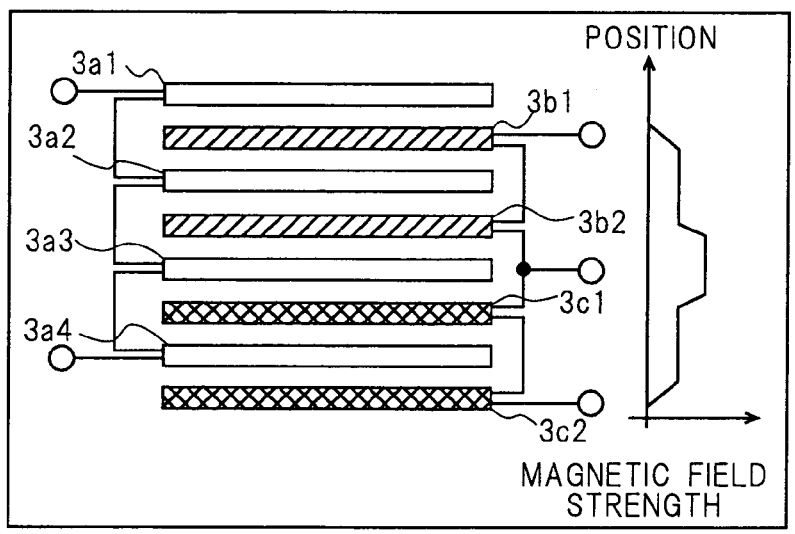
Figure 6:
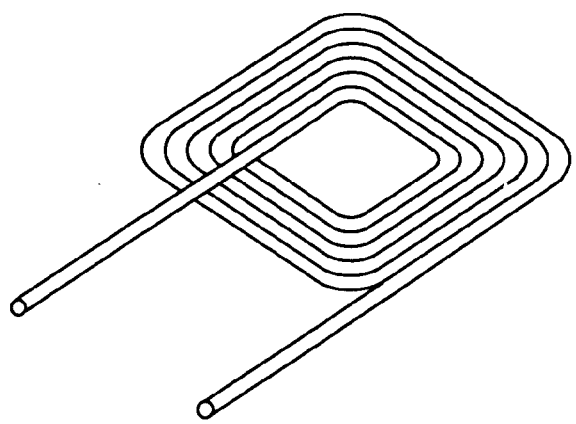
Figure 7:
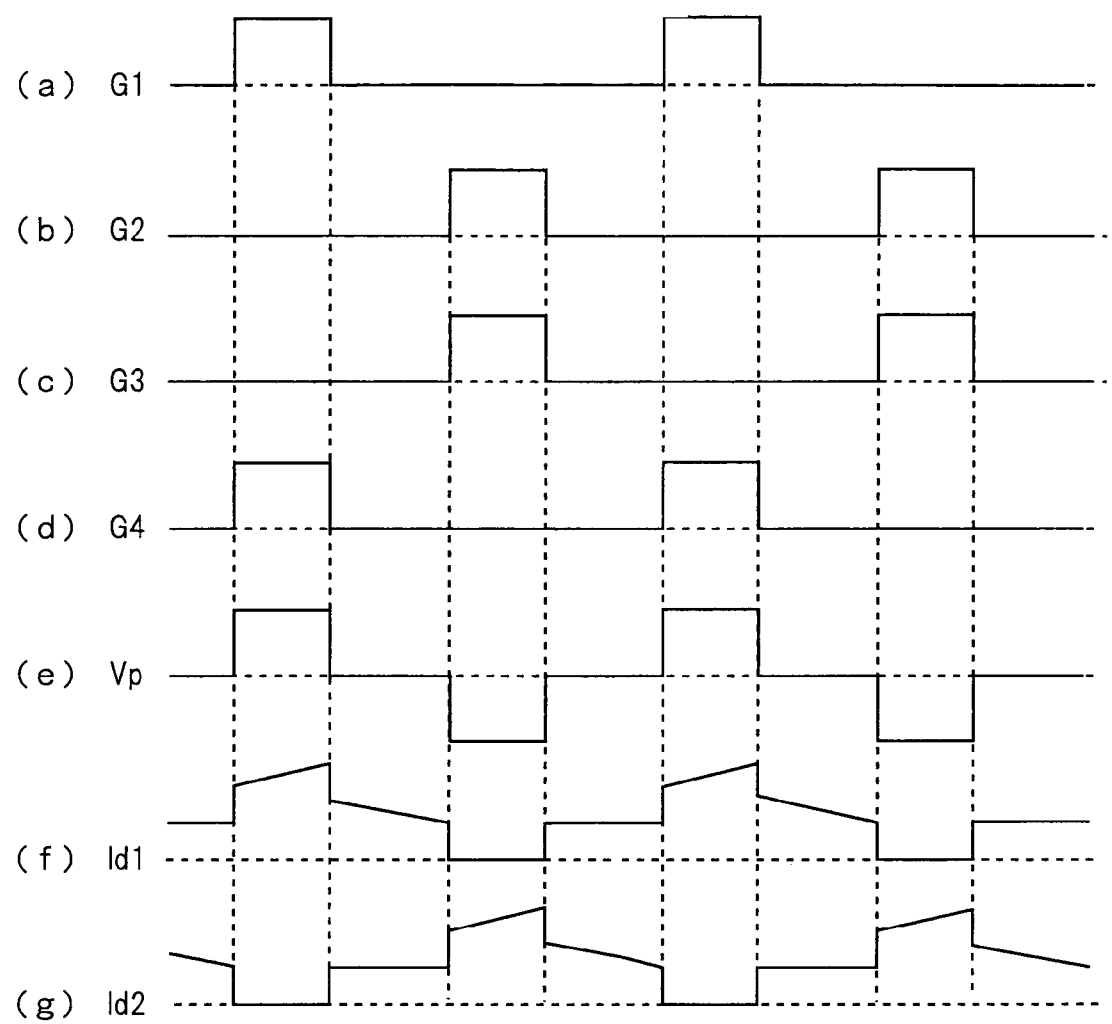

Part (a) of FIG. 5 shows a perspective view of the transformer of the switching power supply device in accordance with the third embodiment of the present invention, part (b) of FIG. 5 shows its front view, part (c) of FIG. 5 shows its sectional view cut along plane I—I, part (d) of FIG. 5 shows the schematic appearance of a single sheet of the printed circuit board coil;

Part (a) of FIG. 6 shows a circuit block diagram of a conventional switching power supply device, part (b) of FIG. 6 is a sectional view of the transformer winding part of the conventional switching power supply device, part (c) of FIG. 6 shows a full view of one of the winding of the transformer winding part of the conventional switching power supply device;

FIG. 7 is an operational waveform chart of each part of the conventional switching power supply device;

Part or All of the drawings are drawn schematically for diagrammatic representation and it should be considered that they do not necessarily reflect relative size and position of components shown therein.

DETAILED DESCRIPTION OF THE INVENTION

Embodiments that specifically show the best mode for conducting the present invention will be described below with reference to figures.

<<First Embodiment>>

A switching power supply device in accordance with a first embodiment of the present invention will be described with reference to FIG. 1 and FIG. 2.

The circuitry of a switching power supply device of the present embodiment at large is the same circuitry as that of the conventional art shown in part (a) of FIG. 6. A switching power supply device of the present embodiment has its characteristics in the winding part of transformer 3, and since the circuitry and its circuit operations are identical, its description will be omitted.

Hereinafter, the configuration of the winding part of the transformer 3 of the switching power supply device according to the present embodiment will be described with reference to FIG. 1. FIG. 1 is a sectional view of the transformer 3 in accordance with the present embodiment.

Figure 1:
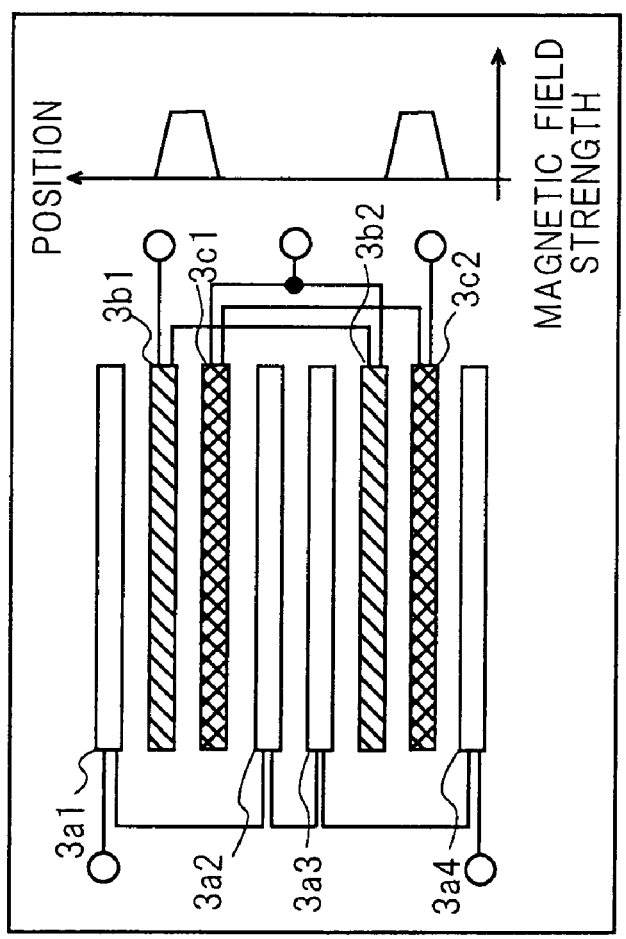
FIG. 1 shows a sectional view of the transformer winding part of the switching power supply device in accordance with the first embodiment of the present invention.
Figure 2:
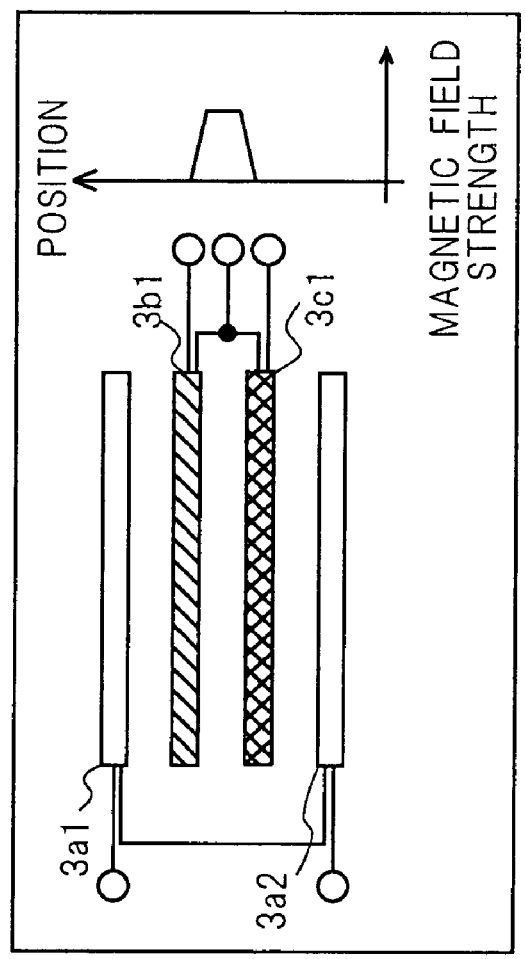
FIG. 2 shows a sectional view of the transformer winding part configured with a unit lamination body of the switching power supply device in accordance with the first embodiment of the present invention.

As shown in FIG. 1, transformer 3 has a first primary coil 3a1, a second primary coil 3a2, a third primary coil 3a3, a fourth primary coil 3a4, and a first secondary coil 3b1, a second secondary coil 3c1, a third secondary coil 3b2 and a fourth secondary coil 3c2.

A first primary coil 3a1, a second primary coil 3a2, a third primary coil 3a3, and a fourth primary coil 3a4 are connected in series, configuring the primary winding 3a in part (a) of FIG. 6. A first secondary coil 3b1 and a third secondary coil 3b2 is connected in series, configuring the first secondary winding 3b in part (a) of FIG. 6, and a second secondary coil 3c1 and a fourth secondary coil 3c2 are connected in series, configuring the second secondary winding 3c in part (a) of FIG. 6. The first secondary winding 3b and the second secondary winding 3c are connected in series. Thus far, it is identical to the conventional art.

In regard to the sequence of the lamination of each coil, the coils will be laminated in the sequence of, from top to bottom, first primary coil 3a1, first secondary coil 3b1, second secondary coil 3c1, second primary coil 3a2, third primary coil 3a3, third secondary coil 3b2, fourth secondary coil 3c2, and fourth primary coil 3a4. The wire turn ratio of primary winding 3a, the first secondary winding 3b and the second secondary winding 3c is N:1:1 (N is an arbitrary positive number).

In the present embodiment as in the case of the conventional art, a strong magnetic field is generated in the space between the first secondary winding 3b and the second secondary winding 3c due to the electric current that flows in the first secondary winding 3b and the second secondary winding 3c within the current distribution period. However, no current will be induced between the first secondary winding 3b1 and the second secondary winding 3c1, since a conductor does not exist between the two windings in the configuration of windings in the present embodiment, and therefore a loss will not occur. A current in an inverse direction to each other flows in the adjacent first secondary winding 3b2 and the second secondary winding 3c2 in the current distribution period, and the magnetic fields induced by the two currents will cancel each other out. Likewise, a current in an inverse direction to each other flows in the adjacent first secondary winding 3b1 and the second secondary winding 3c1 in the current distribution period, and the magnetic fields induced by the two currents will cancel each other out. As a result, no current will be induced to the two primary windings (3a2 and 3a3) placed between the first secondary winding 3b2 and the second secondary winding 3c1, and therefore a loss will not occur.

The extent of magnetic coupling of the primary winding 3a, the first secondary winding 3b and the second secondary winding 3c are strong as in the case of the conventional art (FIG. 6). For example, the extent of magnetic coupling of the primary winding and the secondary winding of the transformer of the present invention is stronger in comparison with that of the transformer wherein a primary winding and a secondary winding is wound completely separated on the EI-cut core.

Although a double-layered unit lamination body laminated in the sequence of, from top to bottom, first primary coil 3a1, first secondary coil 3b1, second secondary coil 3c1, and second primary coil 3a2 was referred to in describing the switching power supply device of the present embodiment, a same effect can be obtained in a case where at least the above-mentioned unit lamination body laminated with one or more is applied. Here, a sectional view of the transformer winding part with a one-layered unit lamination body model is shown in FIG. 2. In the one-layered unit lamination body model, no current will be induced between the first secondary winding and the second secondary winding, since a conductor does not exist between the two windings, and therefore a loss will not occur.

For example, in the transformer wherein a unit lamination body comprising of 3a1–3a4, 3b1, 3b2, 3c1 and 3c2 as shown in FIG. 1 is double-layered, a current in an inverse direction to each other flows in the adjacent first secondary winding 3b2 and the second secondary winding 3c2 in the current distribution period, and the magnetic fields induced by the two currents will cancel each other out. Likewise, a current in an inverse direction to each other flows in the adjacent first secondary winding 3b1 and the second secondary winding 3c1 in the current distribution period, and the magnetic fields induced by the two currents will cancel each other out. As a result, no current will be induced to the two primary windings (3a2 and 3a3) placed between the first secondary winding 3b2 and the second secondary winding 3c1, and therefore a loss will not occur.

It is suitable to configure the transformer by combining and laminating an unit lamination body laminated in the sequence of first primary coil 3a1, first secondary coil 3b1, second secondary coil 3c1, and second primary coil 3a2, with an unit lamination body laminated in the sequence of first primary coil 3a1, second secondary coil 3c1, first secondary coil 3b1, and second primary coil 3a2. Furthermore, it is also suitable to configure the transformer by including the inversed unit lamination bodies of the above in the lamination. Such configuration can also obtain the same effect as that of the present embodiment.

By connecting the primary coils in series, an extremely uneven current distribution of the current flowing in each primary coil can be prevented. Although a case in which each coils configuring the first secondary winding 3b and the second secondary winding 3c are connected in series was described, it goes without saying that a same effect can be obtained by configuring the first secondary winding 3b and the second secondary 3c from connecting each coils in parallel. It was confirmed by simulation and experiment that the AC resistance from the primary coil side when the secondary windings are short-circuited are reduced by 20% to 30% in comparison to the configuration of the conventional transformer winding (part (b) of FIG. 6). Furthermore, although the present embodiment was described in reference with a switching circuit of a full bridge converter type, it goes without saying that a same effect can be obtained by applying to a switching power supply device employing a half bridge converter, push-pull converter, and various circuit system based on these circuits.

<<Second Embodiment>>

A switching power supply device in accordance with a second embodiment of the present invention will be described with reference to FIG. 3 and FIG. 4.

The circuitry of a switching power supply device of the present embodiment at large is the same circuitry as that of the conventional art shown in part (a) of FIG. 6. A switching power supply device of the present embodiment has its characteristics in the winding part of transformer 3, and since the circuitry and its circuit operations are identical, its description will be omitted.

Hereinafter, the configuration of the winding part of the transformer 3 of the switching power supply device according to the present embodiment will be described with reference to FIG. 3. FIG. 3 is a sectional view of the transformer 3 in accordance with the present embodiment.

Figure 3:
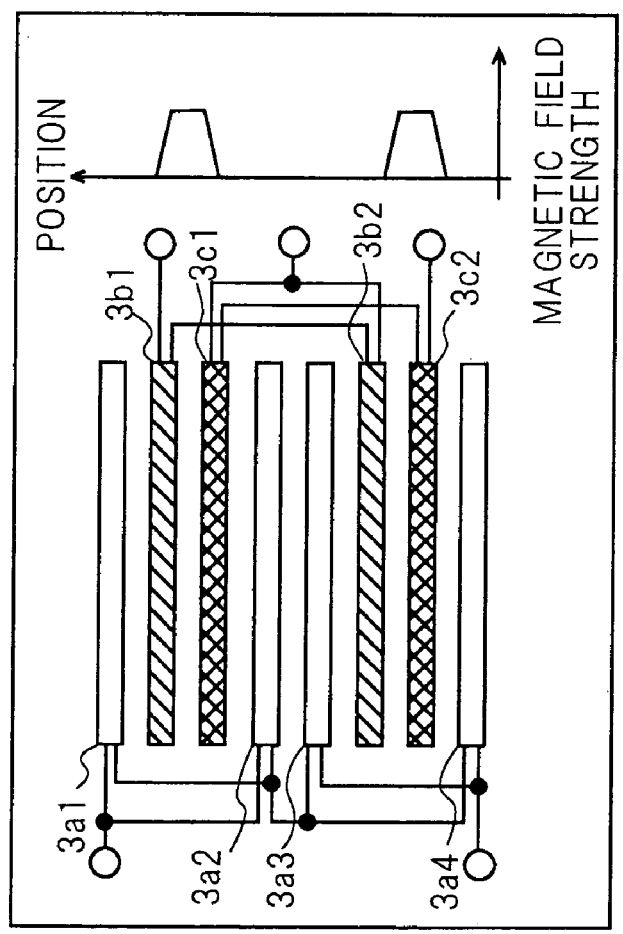
FIG. 3 shows a sectional view of the transformer winding part of the switching power supply device in accordance with the second embodiment of the present invention.
Figure 4:
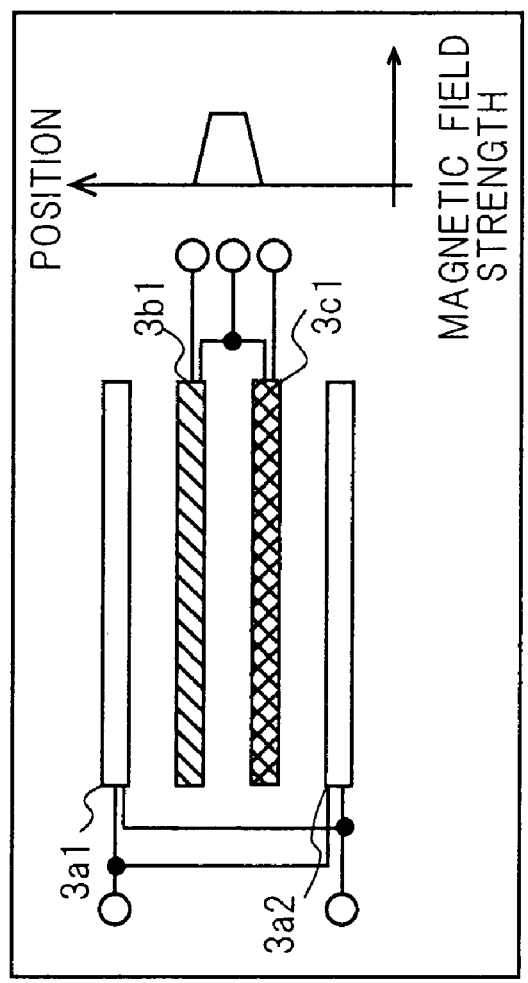
FIG. 4 shows a sectional view of the transformer winding part configured with a unit lamination body of the switching power supply device in accordance with the second embodiment of the present invention.

As shown in FIG. 3, transformer 3 has a first primary coil 3a1, a second primary coil 3a2, a third primary coil 3a3, a fourth primary coil 3a4, and a first secondary coil 3b1, a second secondary coil 3c1, a third secondary coil 3b2, a fourth secondary coil 3c2.

A first primary coil 3a1 and a second primary coil 3a2 are connected in parallel, configuring a first parallel-connected body 3d1, and a third primary coil 3a3 and a fourth primary coil 3a4 is connected in parallel, configuring the second parallel-connected body 3d2. The first parallel-connected body 3d1 and the second parallel-connected body 3d2 are connected in series, configuring a primary winding 3a in part (a) of FIG. 6. A first secondary coil 3b1 and a third secondary coil 3b2 are connected in series, configuring the first secondary winding 3b in part (a) of FIG. 6, and a second secondary coil 3c1 and a fourth secondary coil 3c2 are connected in series, configuring the second secondary winding 3c in part (a) of FIG. 6. The first secondary winding 3b and the second secondary winding 3c are connected in series.

In regard to the sequence of the lamination of each coil, the coils will be laminated in the sequence of, from top to bottom, first primary coil 3a1, first secondary coil 3b1, second secondary coil 3c1, second primary coil 3a2, third primary coil 3a3, third secondary coil 3b2, fourth secondary coil 3c2, and fourth primary coil 3a4. The wire turn ratio of the primary winding 3a, the first secondary winding 3b and the second secondary winding 3c is N:1:1.

By configuring a transformer winding as in the present embodiment, feeding a high current to the primary winding 3a is be possible by connecting the first parallel-connected body 3d1 and the second parallel-connected body 3d2 in series, even in the case of a specification in which the wire turn ratio of the primary winding 3a is small.

As is the case with the first embodiment, an inducement of current due to the strong magnetic field generated in the space between the first secondary winding 3b1 and the second secondary winding 3c1 will not occur within the current distribution period, since a conductor does not exist between the two windings in the current distribution period, and therefore a loss will not occur. A current in an inverse direction to each other flows in the adjacent first secondary winding 3b2 and the, second secondary winding 3c2 in the current distribution period, and the magnetic fields induced by the two currents will cancel each other out. Likewise, a current in an inverse direction to each other flows in the adjacent first secondary winding 3b1 and the second secondary winding 3c1 in the current distribution period, and the magnetic fields induced by the two currents will cancel each other out. As a result, no current will be induced to the two primary windings (3a2 and 3a3) placed between the first secondary winding 3b2 and the second secondary winding 3c1, and therefore a loss will not occur.

The extent of magnetic coupling of the primary winding 3a, the first secondary winding 3b and the second secondary winding 3c are strong as in the case of the conventional art (FIG. 6). For example, the extent of magnetic coupling of the primary winding and the secondary winding of the transformer of the present invention is stronger in comparison with that of the transformer wherein a primary winding and a secondary winding is wound completely separated on the EI-cut core.

Although a double-layered unit lamination body laminated in the sequence of, from top to bottom, first primary coil 3a1, first secondary coil 3b1, second secondary coil 3c1, and second primary coil 3a2 is referred to in describing the switching power supply device of the present embodiment, a similar effect can be obtained in a case where at least a unit lamination body laminated with one or more layer is applied. Here, a sectional view of the transformer winding part with a one-layered unit lamination body model is shown in FIG. 4. In the one-layered unit lamination body model, no current will be induced between the first secondary winding and the second secondary winding, since a conductor does not exist between the two windings, and therefore a loss will not occur. Furthermore, although a case in which the parallel-connected bodies of the primary coil as for the unit lamination body is connected in series with each other was described, the same effect can be obtained when the parallel-connected bodies are connected in parallel with each other.

It is suitable to configure the transformer by combining and laminating an unit lamination body laminated in the sequence of first primary coil 3a1, first secondary coil 3b1, second secondary coil 3c1, and second primary coil 3a2, with an unit lamination body laminated in the sequence of first primary coil 3a1, second secondary coil 3c1, first secondary coil 3b1, and second primary coil 3a2. Furthermore, it is also suitable to configure the transformer by including the inversed unit lamination bodies of the above in the lamination. Such configuration can also obtain the same effect as that of the present embodiment.

Although a case in which each coils configuring the first secondary winding 3b and the second secondary winding 3c are connected in series was described, it goes without saying that a same effect can be obtained by configuring the first secondary winding 3b and the second secondary 3c from connecting each coils in parallel. It was confirmed by simulation and experiment that the AC resistance from the primary coil side when the secondary windings are short-circuited are reduced by 20% to 30% in comparison to the configuration of the conventional transformer winding (part (b) of FIG. 6). Furthermore, although the present embodiment was described in reference with a switching circuit of a full bridge converter type, it goes without saying that a same effect can be obtained by applying to a switching power supply device employing a half bridge converter, push-pull converter, and various circuit system based on these circuits.

<<Third Embodiment>>

A switching power supply device in accordance with a third embodiment of the present invention will be described with reference to FIG. 5.

The circuitry of a switching power supply device of the present embodiment at large is the same circuitry as that of the conventional art shown in part (a) of FIG. 6. A switching power supply device of the present embodiment has its characteristics in the winding part of transformer 3, and since the circuitry and its circuit operations are identical, its description will be omitted.

Part (a) of FIG. 5 shows a perspective view of the present embodiment showing the external form of the transformer having a configuration wherein a printed circuit board coil is laminated, part (b) of FIG. 5 shows its front view, part (c) of FIG. 5 shows its sectional view cut along plane I—I, part (d) of FIG. 5 shows the schematic appearance of a single sheet of the printed circuit board coil. In FIG. 5, a reference numeral 30 denotes a lamination body laminated with a plurality of printed circuit board coil, a reference numeral 34 denotes a terminal, a reference numeral 35 denotes a core, a reference numeral 37 denotes a sheet of printed circuit board coil. Each printed circuit board coil 37 has a coil pattern 31, a through hole 32 at the inner end, a through hole 33 at the outer end, and a penetrating hole 36 is provided in the center. As shown in part (c) of FIG. 5, the core 35 has its metatarsus section penetrated with the penetrating hole 36, configuring a magnetically closed circuit.

The transformer of the present embodiment has a lamination body 30 as the winding of the transformer, wherein the lamination body is laminated in multi-layers of a printed circuit board coil 37, wherein the printed circuit board coil 37 has a conductive pattern dispensed on an insulation circuit board. The printed circuit board coil 37 is a printed circuit board having a layer of 4 or more, and each printed circuit board can have a multi-layered coil. A multi-layered printed circuit board coil 37 is laminated with an insulating layers having the necessary thickness in between each coil pattern, and has the terminal of each coil pattern (inner end 32 and outer end 33) connected to other upper and lower printed circuit board coils 37, thereby configuring a coil. For example, the inner end 32 is connected with any one of the through hole 38 to 44 provided at the peripheral of the printed circuit board coil 37, and the terminal 34 is connected to the through hole and the outer terminal, interconnecting the upper and lower printed circuit board coil 37, via the conductor pattern provided on the rear surface of the printed circuit board coil 37 which is a double-sided printed circuit board. For example, by providing a differing conductor pattern for each first primary coil 3a1, first secondary coil 3b1, second secondary coil 3c1, second primary coil 3a2, third primary coil 3a3, third secondary coil 3b2, fourth secondary coil 3c2, and fourth primary coil 3a4, and using the differing through hole as a connecting terminal, each winding of the transformer is formed.

Hereinafter, the configuration of the winding part of the transformer 3 of the switching power supply device according to the present embodiment will be described with reference to FIG. 1. The connection and lamination of each coil of the transformer 3 of the present embodiment is the same as that of the first embodiment shown in FIG. 1. FIG. 1 is a sectional view of the transformer 3 in accordance with the present embodiment.

In FIG. 1, a first primary coil 3a1, a second primary coil 3a2, a third primary coil 3a3, and a fourth primary coil 3a4 are connected in series through a through hole 32 of the inner end of the coil pattern 31 and a through hole 33 of the outer end of the coil pattern 31, configuring the primary winding 3a in FIG. 6.

A first secondary coil 3b1 and a third secondary coil 3b2 is connected in series through a through hole 32 of the inner end of the coil pattern 31 and a through hole 33 of the outer end of the coil pattern 31, configuring the first secondary winding 3b in FIG. 6, and a second secondary coil 3c1 and a fourth secondary coil 3c2 are connected in series through a through hole 32 of the inner end of the coil pattern 31 and a through hole 33 of the outer end of the coil pattern 31, configuring the second secondary winding 3c in FIG. 6. The first secondary winding 3b and the second secondary winding 3c are connected in series.

In regard to the sequence of the lamination of each coil, the coils will be laminated in the sequence of, from top to bottom, first primary coil 3a1, first secondary coil 3b1, second secondary coil 3c1, second primary coil 3a2, third primary coil 3a3, third secondary coil 3b2, fourth secondary coil 3c2, and fourth primary coil 3a4. The wire turn ratio of the primary winding 3a, the first secondary winding 3b and the second secondary winding 3c is N:1:1.

By such configuration, manufacturing a transformer wherein the interlayer distance between each coil is highly precise and stable becomes possible.

As is the case with the first embodiment, inducement of current due to the strong magnetic field generated in the space between the first secondary winding 3b1 and the second secondary winding 3c1 will not occur, since a conductor does not exist between the two windings within the current distribution period, and therefore a loss will not occur. A current in an inverse direction to each other flows in the adjacent first secondary winding 3b2 and the second secondary winding 3c2 in the current distribution period, and the magnetic fields induced by the two currents will cancel each other out. Likewise, a current in an inverse direction to each other flows in the adjacent first secondary winding 3b1 and the second secondary winding 3c1 in the current distribution period, and the magnetic fields induced by the two currents will cancel each other out. As a result, no current will be induced to the two primary windings (3a2 and 3a3) placed between the first secondary winding 3b2 and the second secondary winding 3c1, and therefore a loss will not occur. The extent of magnetic coupling of the primary winding 3a, the first secondary winding 3b and the second secondary winding 3c are strong as in the case of the conventional art (FIG. 6). For example, the extent of magnetic coupling of the primary winding and the secondary winding of the transformer of the present invention is stronger in comparison with that of the transformer wherein a primary winding and a secondary winding is wound completely separated on the EI-cut core.

Although a multi-layered printed circuit board coil in which the multi-layered printed circuit board coil is a double-layered unit lamination body, laminated in the sequence of, from top to bottom, first primary coil 3a1, first secondary coil 3b1, second secondary coil 3c1, second primary coil 3a2 as the transformer winding, was referred to in describing the switching power supply device of the present embodiment, a similar effect can be obtained in a case where at least a unit lamination body laminated with one or more layer is applied. In the one-layered unit lamination body model, no current will be induced between the first secondary winding and the second secondary winding, since a conductor does not exist between the two windings, and therefore a loss will not occur.

Although a case in which each coils configuring the first secondary winding and the second secondary winding are connected in series was described, it goes without saying that a same effect can be obtained by configuring the first secondary winding and the second secondary from connecting each coils in parallel.

It is suitable to configure the transformer by combining and laminating an unit lamination body laminated in the sequence of first primary coil 3a1, first secondary coil 3b1, second secondary coil 3c1, and second primary coil 3a2, with an unit lamination body laminated in the sequence of first primary coil 3a1, second secondary coil 3c1, first secondary coil 3b1, and second primary coil 3a2. It is also suitable to configure the transformer by including the inversed unit lamination bodies of the above in the lamination. Such configuration can also obtain the same effect as that of the present embodiment. It was confirmed by simulation and experiment that the AC resistance from the primary coil side when the secondary windings are short-circuited are reduced by 20% to 30% in comparison to the configuration of the conventional transformer winding (part (b) of FIG. 6).

The number of wire turns of the primary coil can be one turn in each layer or as the whole body configuring the printed circuit board coil 37 in the transformer 3. The number of wire turns of the secondary coil can be one turn in each layer or as the whole body configuring the printed circuit board coil 37 in the transformer 3. The number of wire turns of the primary coil can be N turn, and the first secondary coil and second secondary coil can be one turn in each layer or as the whole body configuring the printed circuit board coil 37 in the transformer 3. By making each coil pattern configuring the printed circuit board coil 37 to be one turn, and connecting the coil pattern of all the layers in parallel, the number of wire turn of the coil as a whole body can be one turn.

Preferably, the number of wire turn of the coil pattern of the primary coil of each layer configuring the printed circuit board coil 37 is one turn, and all coil patterns are connected either in series or in parallels. Then the number of wire turn of the coil pattern of the secondary coil of each layer configuring the printed circuit board coil 37 is one turn, and all coil patterns are connected either in series or in parallels.

In a case where the number of the wire turns in each layer is more than one turn, the coil pattern 31 becomes into a vortex shape, and therefore a need arises to provide a through hole 32 to the inner end of the coil pattern and to connect coil patterns of each layer to each other via through hole 32. In the case where the input voltage of the primary coil is a high voltage equal to or above the predetermined value, a creepage distance for insulation between the primary coil, the secondary coil and the core 35 must be equal to or more than the distance pursuant to the safety standard (e.g. 10 mm). However, to provide a through hole 32 in the inner of the coil pattern maintaining the predetermined creepage distance will become a cause for the upsizing of the transformer 3 and for the increase of the electrical power loss. Furthermore, the current capacity of the connecting part via the through hole 32 of the inner end of the coil pattern is small and cannot feed a high current to the coil.

By configuring so that it will be one turn per one layer, a connection via through hole 32 of the inner end of the coil pattern will be totally unnecessary. A circuit board formed with the predetermined bodies without a through hole fulfill the roll as an insulating sheet in itself. In such case, a spatial distance between the primary coil, the secondary coil and the core 35 can be shortened and at the same time maintain a effectual creepage distance for insulation pursuant to the safety standard. Herewith, miniaturization/thinning of a transformer and enlarging of an input/output current capacity is possible, enabling to reduce the electric power loss.

Although the present embodiment was described in reference with a switching circuit of a full bridge converter type, it goes without saying that a same effect can be obtained by applying to a switching power supply device employing a half bridge converter, push-pull converter, and various circuit system based on these circuits.

It goes without saying that a transformer of the second embodiment and a switching power supply device using the same can be achieved by a configuration laminating a printed circuit board coil, as in the case of the third embodiment.

With the present invention, an advantageous effect can be obtained wherein a switching power supply device has a high conversion efficiency using a transformer in which the magnetic coupling between the primary winding and the secondary winding is strong and losses are small can be achieved.

The switching power supply device of the present invention can obtain an advantageous effect wherein an inducement of current in the space between the first secondary winding and the second secondary winding will not occur, even in the case where a strong magnetic field is generated due to the electric current that flows in the first secondary winding and the second secondary winding, since a conductor does not exist between the first secondary winding 3b and the second secondary winding 3c in the current distribution period, and therefore a loss will not occur. Furthermore, a current in an inverse direction to each other flows in the adjacent first secondary winding 3b and the second secondary winding 3c in the current distribution period, and the magnetic fields induced by the two currents will cancel each other out. As a result, an advantageous effect can be obtained wherein an inducement of current to the primary winding placed between the first secondary winding 3b and the second secondary winding 3c will not occur, and therefore a loss will not occur.

Furthermore, the magnetic coupling between the first secondary winding and the second secondary winding will become strong, since the average distance between the first secondary winding and the second secondary winding is short. Therefore, an advantageous effect can be obtained in which a switching power supply device having a high conversion efficiency can be provided.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A switching power supply device comprising:
   a transformer having at least a first primary coil, a first secondary coil, a second secondary coil and a second primary coil, which are laminated in the sequence of said first primary coil, said first secondary coil, said second secondary coil that is adjacent to said first secondary coil, and said second primary coil, and having a configuration wherein a center tap is drawn out from a connecting part between one end of said first secondary coil and one end of said second secondary coil;
   a switching part for alternately applying a voltage in a forward direction and an inverse direction to said transformer;
   a rectifying part for rectifying the voltage induced across said center tap of said transformer and the other end of said first secondary coil or the other end of said second secondary coil;
   a smoothing part for smoothing the voltage of said rectifying part; and
   a control part for controlling the on-off of said switching part so that said first primary coil and said second primary coil are opened when said switching part turns off, then the magnetic fields induced by a current flowing in said first secondary coil and a current flowing in said second secondary coil cancel out each other by flowing currents in inverse directions to each other in said first secondary coil and said second secondary coil, so as to maintain the continuity of the magnetic flux of said transformer.

2. A switching power supply device comprising:

a transformer having a configuration wherein a unit lamination body having at least a first primary coil, a first secondary coil, a second secondary coil that is adjacent to said first secondary coil, and a second primary coil, laminated in the sequence of said first primary coil, said first secondary coil, said second secondary coil and said second primary coil, and/or a unit lamination body having at least said first primary coil, said first secondary coil, said second secondary coil and said second primary coil, laminated in the sequence of said first primary coil, said second secondary coil that is adjacent to said first secondary coil, said first secondary coil and said second primary coil, is laminated in multiple layers or are laminated in multiple layers by combining both unit lamination bodies, and wherein a center tap is drawn out from a connecting part between one end of said first secondary coil and one end of said second secondary coil, each coil being made by connecting a plurality of unit lamination bodies between each other a switching part for alternately applying a voltage in a forward direction and an inverse direction to said transformer;

a rectifying part for rectifying the voltage induced across said center tap of said transformer and the other end of said first secondary coil or the other end of said second secondary coil, each coil being made by connecting a plurality of unit lamination bodies;

a smoothing part for smoothing the voltage of said rectifying part; and a control part for controlling the on-off of said switching part so that said first primary coil and said second primary coil are opened when said switching part turns off, then the magnetic fields induced by a current flowing in said first secondary coil and a current flowing in said second secondary coil cancel out each other by flowing currents in inverse directions to each other in said first secondary coil and said secondary coil, so as to maintain the continuity of the magnetic flux of said transformer.

3. A switching power supply device in accordance with claim 1, wherein in said transformer, all primary coils are connected in series.

4. A switching power supply device in accordance with claim 2, wherein in said transformer, all primary coils are connected in series.

5. A switching power supply device in accordance with claim 2, wherein in said transformer, parallel-connected bodies are configured by connecting the primary coils of unit lamination bodies in parallel, and said parallel-connected bodies are each connected in series.

6. A switching power supply device in accordance with any claim 1, wherein in said transformer, a primary coil and a secondary coil are laminated in multiple layers wherein each of multiple layers is configured of a printed circuit board coil, the printed circuit board has a conductive pattern dispensed on an insulation circuit board, and the primary coil and the secondary coil are connected via a connecting part of the inner end or the outer end of the coil pattern, configuring windings.

7. A switching power supply device in accordance with any claim 2, wherein in said transformer, a primary coil and a secondary coil are laminated in multiple layers wherein each of multiple layers is configured of a printed circuit board coil, the printed circuit board has a conductive pattern dispensed on an insulation circuit board, and the primary coil and the secondary coil are connected via a connecting part of the inner end or the outer end of the coil pattern, configuring windings.

8. A switching power supply device in accordance with claim 6, wherein in said transformer, the number of wire turns of the primary coil and/or the secondary coil is one turn in each layer or as the whole body.

9. A switching power supply device in accordance with claim 7, wherein in said transformer, the number of wire turns of the primary coil and/or the secondary coil is one turn in each layer or as the whole body.

10. A switching power supply device in accordance with claim 2, wherein in each layer or as a whole body in said transformer, the number of wire turns of the primary coil is N turn (N is an arbitrary positive number), and the number of wire turns of said first secondary coil and said second secondary coil is one turn.

* * * * *

UNITED STATES PATENT AND TRADEMARK OFFICE
CERTIFICATE OF CORRECTION

PATENT NO. : 6,972,656 B2
DATED : December 6, 2005
INVENTOR(S) : Yoshihiro Takeshima et al.

It is certified that error appears in the above-identified patent and that said Letters Patent is hereby corrected as shown below:

Column 16,
Lines 12 and 23, delete "any".

Signed and Sealed this

Seventh Day of March, 2006

JON W. DUDAS
*Director of the United States Patent and Trademark Office*